United States Patent [19]

Vockenhuber

[11] 3,911,451
[45] Oct. 7, 1975

[54] COMBINED TELESCOPE AND CAMERA SIGHT

[76] Inventor: Karl Vockenhuber, Potzleinsdorferstrasse 118, Vienna 18, Austria

[22] Filed: Nov. 7, 1973

[21] Appl. No.: 413,427

[30] Foreign Application Priority Data
Nov. 8, 1972 Austria .................... 9471/72

[52] U.S. Cl. .................................. 354/79
[51] Int. Cl.² .............................. G03B 17/48
[58] Field of Search ............ 95/12; 354/75, 79

[56] References Cited
UNITED STATES PATENTS
3,546,378  12/1970  Karikawa .................... 354/75

*Primary Examiner*—John M. Horan
*Attorney, Agent, or Firm*—Ernest G. Montague; Karl F. Ross; Herbert Dubno

[57] ABSTRACT

A telescopic gun sight is provided with a mount for a removable camera to enable an object to be photographed through the telescope. The light path from the telescope to the camera is provided by a beam splitter which separates some of the light travelling along the optical axis of the telescope and diverts it towards a collimator and a window in the wall of the telescope. The collimator provides parallel rays from this diverted light so that the camera attached to the mount can be a fixed focal-length camera. An arrangement is provided for blanking off the window when the camera is not fitted to the telescope.

9 Claims, 4 Drawing Figures

COMBINED TELESCOPE AND CAMERA SIGHT

FIELD OF THE INVENTION

The invention relates to a telescope, more particularly to a telescopic sight for firearms, with a housing, the optical path being provided with a beam splitter for deflecting at least part of the incident light from the telescope objective to an opening which is provided in the housing.

BACKGROUND TO THE INVENTION

Telescopes of this kind have been known for a long time, the light deflected in the optical system of the telescope being supplied to a camera which is mounted on the said telescope. However, in order to mount the camera on the telescope it was necessary for the camera lens to be previously removed before the camera could be mounted on the telescope by means of its lens screwthread. This system suffered from substantial disadvantages because only expensive cameras, namely those adapted for lens changing, could be mounted on the telescope. Cameras with fixed lenses, as is the case with most inexpensive cameras, could not be used. A second decisive disadvantage was that the camera could only be removed from the telescope or mounted thereon in a relatively complicated and time-consuming manner. As a direct consequence of this any sudden opportunity for a "snap shot" was lost if the wrong attachment was fitted to the firearm.

OBJECT OF THE INVENTION

An object of the invention is the provision of a telescopic sight to which a relatively cheap camera can be fitted.

SUMMARY OF THE INVENTION

In accordance with the present invention there is provided a telescopic sight comprising a sighting telescope defining a line of sight, a beam splitter assembly in the telescope to divert laterally part of the light travelling along the line of sight from a viewed object, a collimator providing parallel light rays from the laterally diverted light part, a side window in the telescope through which the laterally diverted light is directed, and a camera mounting device or coupling means for removably holding a fixed lens camera at a position at which its objective receives the parallel light rays and the viewed object can be photographed thereby.

The provision of a collimator provides the camera lens with parallel light so that when taking exposures of observed objects from substantial distances, as is usual with telescopes, a sharp image is produced in all cases. It is therefore not necessary to prepare the camera for mounting on the telescope by removing the camera objective. Thus fixed-objective and therefore less expensive cameras can be attached to the telescope. A suitable camera for use with the invention is a small cassette camera such as that known as the "pocket instamatic" camera. As this camera has a small size it can be arranged so as not to project beyond the contour of a medium sized telescopic sight, if it is appropriately attached.

PREFERRED FEATURES OF THE INVENTION

In one embodiment of the invention a sensing device for detecting camera presence and preferably associated with the camera mounting device or coupling means is provided, the sensing device being adapted to switch a beam splitter into the optical objective path of the telescope. In its simplest form, the sensing device can be constructed as a sensing lever which is hinged to a support for the beam splitter and, being biased by a spring, retains the beam splitter in its position in which it is moved out of the optical objective path of the telescope and projects from the mounting device when the camera is not attached.

To prevent extraneous light from entering the additional opening on the telescope into the optical objective path when the camera is not attached, a closure may be provided for blocking a lateral opening on the telescope when the beam splitter is in the inoperative position. The positioning of the closure can be controllable by the camera sensing device or by a further sensing device.

When photographing through the telescope it is essential that exposure controls are correctly adjusted on the camera. If the camera is provided with a through-the-lens exposure metering device no further precautions are necessary since the amount of light, which passes through the interposed beam splitter and strikes the film, defines the setting of the exposure controls. The situation is different in a camera with an exposure meter for outside light. Since the part of the camera which responds to the brightness and contains a photoelectric transducer is usually disposed on the lens side it means that the transducer is receiving light directly from the vicinity of the telescope casing and therefore responds as if very little light is present. To overcome this difficulty, an additional optical system may be provided on the telescope, for example an optical fiber rod to supply light from the object to the exposure meter of the camera. To avoid falsification of the measured result by prevailing ambient light, it is preferred to attach a screen which cuts out ambient light in the vicinity of the mounting device for the camera.

Since the amount of light supplied to the camera from the principal optical path of the telescope via the beam splitter is attenuated by light losses in the objective of the telescope it is convenient to attenuate the amount of light which is supplied to the exposure meter via the additional optical system in order to ensure that a correct exposure reading is obtained. An inexpensive camera with a diaphragm giving an aperture of f11 or f8 would from the very beginning set itself to the largest adjustable aperture so that the best possible exposure of the photographic image is provided in each case. However, it is possible in the case of more sensitive cameras for the amount of light supplied by the supplementary optical system to produce a diaphragm setting in the exposure meter which would not correspond with the amount of light supplied to the camera lens. This means that the diaphragm would not open to the extent necessary to compensate for an object beam which is subject to light losses before entering the camera lens and in consequence the photographed image would be under exposed. In order to avoid this the telescope may be provided with means, preferably associated with the mounting device, for logging a value corresponding to the maximum adjustable aperture of the attached camera. The device is adapted to control a second device, preferably a neutral density filter, which attenuates the light in the additional optical system. Such an arrangement has the advantage that it allows for the fact that the diaphragm aperture of a currently available "instamatic" camera is fixed and only the shutter time is adjusted. Since the diaphragm aperture of the camera is known to the operator, he need only interpose the appropriate neutral density filter into the additional optical system by means of the second device in order to obtain a correctly exposed photograph. The diaphragm aperture as corrected by the neutral density filter could be larger by approximately 1f stop than the uncorrected setting.

BRIEF DESCRIPTION OF THE DRAWING

The invention will now be described in more detail, with reference to the accompanying partially diagrammatic drawings, in which.

PREFERRED EMBODIMENT

Figure 1:
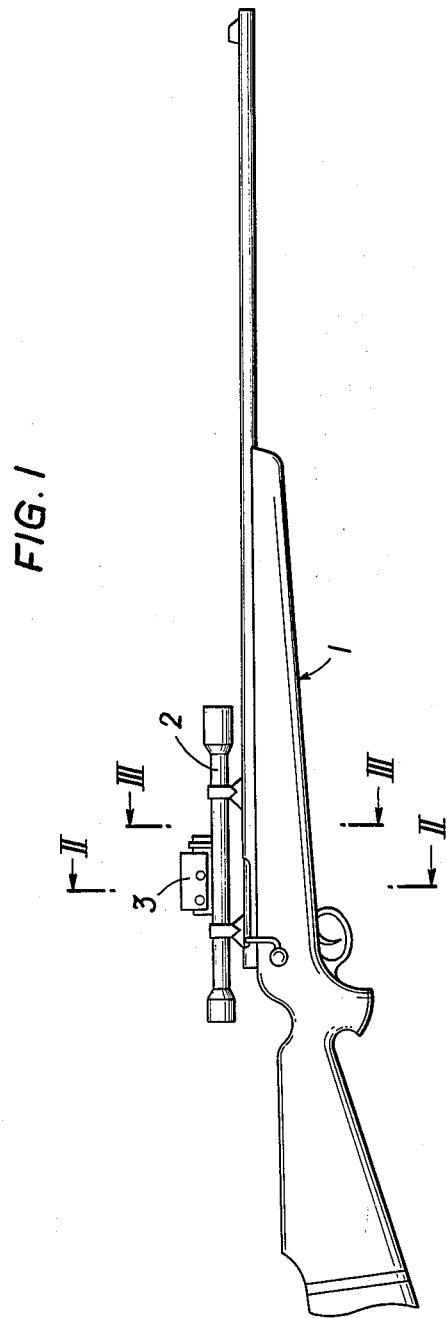
FIG. 1 shows a rifle in elevation having a telescopic sight with a camera attachment according to the invention.
Figure 2:
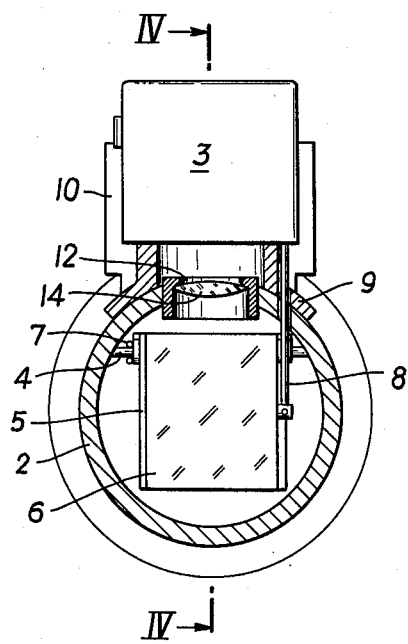
FIGS. 2 and 3 are cross-sections through the camera and sight of FIG. 1 and taken on the line and in the direction indicated by the arrows II—II and III—III, respectively, in that Figure.
Figure 4:
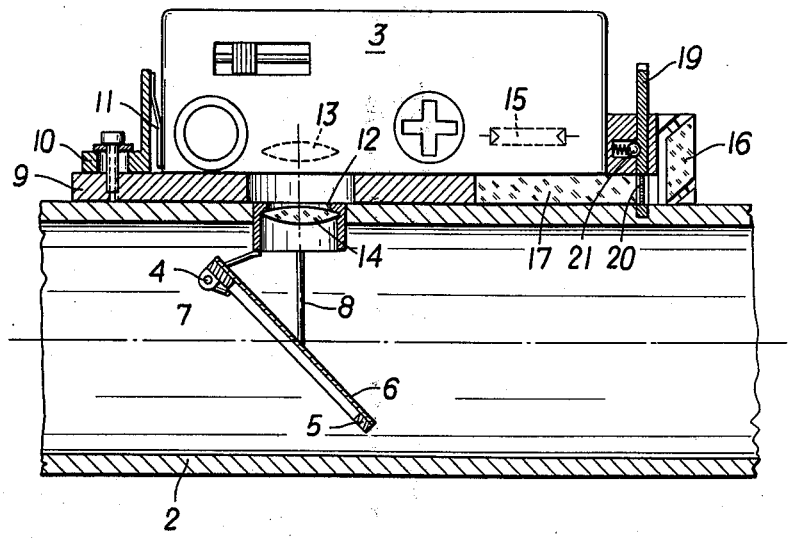
FIG. 4 is a longitudinal section through the camera and sight and seen on the line and in the direction of the arrows IV—IV in FIG. 2.

In FIG. 1 a rifle 1 has a telescopic sight with a camera 3 mounted on it. As shown in FIG. 4 the interior of the telescope 2 is provided with a beam splitter formed by a reflector support 5 which is pivotable about an axis 4 and has a semi-transparent deflecting mirror 6 mounted upon it in order to supply light from a sighted object partially to a telescope eye piece, not shown in detail, and partially to a camera lens 13. At this point it should be mentioned that the beam splitter need not be a mirror, a prism could also perform this function. The mirror support 5 is retained in its inoperative state by a hairspring 7 located at a position in which it does not influence the optical path through the telescope. At a similar non-influencing position a sensing slide 8, hinged to the mirror support 5, projects into a mounting device 9 for the camera 3. The device 9 can be adapted to fit the camera in use by means of an adjustable bracket 10. The camera 3, when mounted on the device 9, is located in position by a spring 11. When the camera 3 is so mounted, it presses the sensing slide 8 downwardly (FIG. 2) — so that the mirror 6 is moved into the optical telescope path against the action of the hairpin spring 7. The force of the hairpin spring 7 is less than the frictional resistance of the locating spring 11 so that the camera 3 cannot be ejected by the sensing element 8. Motion of the mirror 6 into its operating position also causes it to free a lateral opening 12 in the telescope 2 through which light from the object is partially supplied to the camera lens 13 13 when the mirror is in the operating position shown in FIG. 4. In the inoperative position of the support 5, the opening 12 is covered by it so that no external light can enter the telescope.

Since the camera 3 together with its lens 13 is attached to the telescope, it is necessary that the light beam supplied to the camera lens must travel practically parallel to its optical axis if a sharply focused image is to be obtained. A collimator 14 is provided for this purpose in the zone of the lateral opening 12. It is clear that any other suitable optical device can be used in place of the collimator 14 in order to supply the camera with parallel light from the telescope axis. This device enables any desired camera, e.g, of fixed focal length to be attached to the telescope and a sharply focused image is ensured without any previous adjustment of the telescope or the camera which includes the usual objective lens.

No additional precautions are necessary to supply light from the object to the exposure meter if the camera 3 performs the exposure measurement by the 'through-the-lens' method. The situation is different if the exposure meter of the camera is controlled by an external light measuring system. Wrong exposure settings would result in this case since the exposure meter, if located beside the lens and responsive to light in the general direction in which the camera objective is trained (as is generally the case), on the telescope housing. To overcome this difficulty object light is supplied to the exposure meter 15 via a prism 16 and a glass or optical fiber rod 17 (FIG. 4). The prism 16 is provided only to prevent the reading of the incident light beam from being adversely influenced by the thickening of the telescope diameter which occurs on the objective side and eye piece side as is normally the case with a telescopic gun sight. The exposure meter is screened by side walls 18 (FIG. 3) against ambient light.

Figure 3:
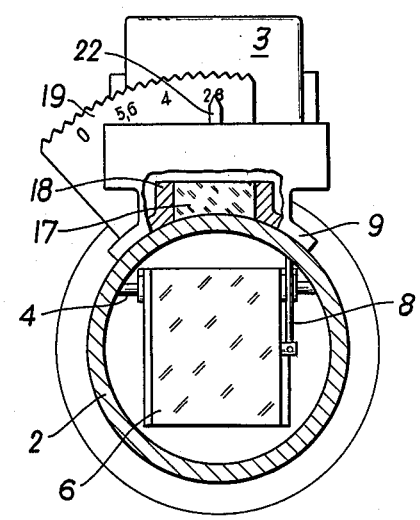

It can happen that the diaphragm of a highly sensitive camera with an aperture of approximately f5.6 and greater, is set to an effective aperture which is smaller than it should be to correspond to the light intensity which is received on the film via the telescope objective. Light losses in the objective or on the beam splitter necessitate the adjustment to a large diaphragm aperture in these sensitive cameras in order to obtain a correctly exposed photograph. To achieve this correction the supplementary optical system comprising the optical fibre rod 17 and the prism 16 is provided with adjustment means for the maximum available aperture and this system is associated with a set of neutral density filters (FIGS. 3 and 4). The adjustment means comprises an adjusting device 19 formed by a turnable hinged sector-shaped part which is guided in the camera mounting device 9. In the present case it is provided with three neutral density filters 20 which can be moved selectively into the optical path of the optical system. A neutral density filter 20 of greater or lesser light transmissivity is moved in front of the optical fibre rod 17 depending on the maximum possible diaphragm aperture of the attached camera 3. For example, the brightest filter 20 is associated with the aperture f2.8. The position of the neutral density filters in the optical path is positively located by a ball ratchet 21. A mark 22 on the mounting device 9 indicates which of the neutral density filters is engaged.

OPERATION OF THE PREFERRED EMBODIMENT

The neutral density filters 20 therefore define the metered amount of light incident upon the exposure meter in dependence on the maximum adjustable diaphragm aperture of the camera. This has the effect of increasing the setting of the required diaphragm aperture approximately 1f number in order solely to compensate for light losses in the telescope. When using less sensitive cameras the adjustable device 19 can be moved into a O position in which the additional optical system is not affected by any of the neutral density filters.

The camera 3 and the mounting device 9 are disposed on the telescope so that the longest body axis thereof is in flush alignment with the optical axis of the telescope. Contour edges of the camera and of the mounting device therefore project very little, if at all, beyond the contour of the telescope and the entire system is therefore compact and handy.

I claim:

1. A telescopic gun sight comprising a sighting telescope defining an axis for a sighting beam, a beam splitting assembly inside the telescope and diverting laterally part of said sighting beam, a collimator on which the laterally diverted beam part is incident and providing collimated light therefrom, means defining a window in the telescopic wall through which light from the diverted beam part passes, a camera mounting device external to the telescope having coupling means for removably receiving a fixed lens camera, and a fixed lens camera removably mounted in said coupling means with its lens aligned with and receiving light from said collimator, said coupling means having adjustable clamps to enable cameras of different sizes to be held by said device.

2. A telescopic gun sight comprising a sighting telescope defining an axis for a sighting beam, a beam splitting assembly mounted inside the telescope and movable between a first position at which it is to one side of the sighting beam axis, and a second position at which it intercepts said sighting beam, a sensing-and-displacing member projecting through the wall of the telescope and actuatable from outside the telescope and operably connected to said assembly to move the assembly from its first position to its second position, resilient biasing means urging the assembly towards its first position, a collimator on which the laterally diverted beam part is incident and providing collimated light therefrom, means defining a window in the telescopic wall through which light from the diverted beam part passes, a camera mounting device external to the telescope having coupling means whereby a fixed lens camera can be removably mounted in the device, and a fixed lens camera removably inserted into said coupling means with its lens aligned with and receiving light from said collimator, said sensing-and-displacing member being positioned to detect the emplacement of the camera on the telescope and for actuation by said camera upon the insertion of said camera into said coupling means to displace said assembly.

3. A telescopic gun sight comprising a sighting telescope defining an axis for a sighting beam, a beam splitting assembly mounted inside the telescope and movable between a first position at which it is to one side of the sighting beam axis, and a second position at which it intercepts said sight-beam, a sensing-and-displacing member projecting through the wall of the telescope and actuable from outside the telescope and operably connected to said assembly to move the assembly from its first position to its second position, resilient biasing means urging the assembly towards its first position a collimator on which the laterally diverted beam part is incident and providing collimated light therefrom, means defining a window in the telescopic wall through which light from the diverted beam part passes, and a camera mounting device external to the telescope whereby a fixed lens camera mounted in the device has its objective receiving the collimated light, said sensing-and-displacing member comprising a resiliently biased push rod one end of which is attached to the beam splitter assembly and the other end of which projects through a side opening in the telescope, and positioned to detect the emplacement of the camera on the telescope and for engagement by said camera upon its insertion into said device to displace said assembly.

4. A telescopic gun sight comprising a sighting telescope defining an axis for a sighting beam, a beam splitting assembly mounted inside the telescope and movable between a first position at which it is to one side of the sighting beam axis, and a second position at which it intercepts said sighting beam, a sensing-and-displacing member projecting through the wall of the telescope and actuated from outside the telescope and operably connected to said assembly to move the assembly from its first position to its second position, resilient biasing means urging the assembly towards its first position, a collimator on which the laterally diverted beam part is incident and providing collimated light therefrom, means defining a window in the telescope wall through which light from the diverted beam part passes, a camera mounting device external to the telescope whereby a fixed lens camera mounted in the device has its objective receiving the collimated light, said sensing-and-displacing member being positioned to detect the emplacement of the camera on the telescope and actuaged by fitting a camera in said mounting device to displace said assembly, said beam splitter assembly including a movable support, a beam splitting unitd carried by the support, and a hinge connection between the support and the telescope inside wall, said sensing-and-displacing member including a push rod having one end pivoted to the support to turn it about the hinge axis with axial movement of the push rod.

5. A sight as claimed in claim 4, in which the mounting device includes an additional optical system for directing light from the direction of the line of sight to a position at which it is incident on a light meter of a camera when mounted on the device.

6. A telescopic gun sight comprising a sighting telescope defining an axis for a sighting beam, a beam splitting assembly mounted inside the telescope and movable between a first position at which it is to one side of the sighting beam axis, and a second position at which it intercepts said sighting beam, a sensing member actuated from outside of the telescope and operably connected to move the assembly from its first position to its second position, resilient biasing means urging the assembly towards its first position, a collimator on which the laterally diverted beam part is incident and providing collimated light therefrom, means defining a window in the telescopic wall through which light from the diverted beam part passes, and a camera mounting device external to the telescope whereby a fixed lens camera mounted in the device has its objective receiving the collimated light, said sensing member being actuated by fitting a camera in said mounting device, said sight further including an element on the beam splitting assembly and movable therewith to blank off the window when the assembly is in its first position.

7. A telescopic gun sight comprising a sighting telescope defining an axis for a sighting beam, a beam splitting assembly inside the telescope and diverting laterally part of said sighting beam, a collimator on which the laterally diverted beam part is incident and providing collimated light therefrom, said collimator and said assembly providing a first optical system, means defining a window in one side of the telescope the through which light from the diverted beam part passes, a camera mounting device external to the telescope, a camera having a fixed lens objective and mounted in said mounting device with said objective receiving parallel light from said collimator, a light meter on the camera, and an additional optical system outside the telescope and guiding onto the light meter light from the general direction of the viewed object.

8. A sight as claimed in claim 7, in which the additional optical system includes a changeable neutral filter attenuator provided with a selector adjustable to vary the attenuation and to log a value corresponding to the maximum adjustable aperture of the camera.

9. A sight as claimed in claim 7, in which the camera is parallelepiped shaped and has its longest dimension extending in the direction of the telescope line of sight and the bulk of its dimensions contained within the overall dimensions of the telescope.

* * * * *